United States Patent [19]

Schubert et al.

[11] Patent Number: 4,813,736

[45] Date of Patent: Mar. 21, 1989

[54] DRIVER'S CABS

[75] Inventors: Klaus Schubert; Werner Schmidt; Gerhard Watzek, all of Munich; Erich Koch, Karlsfeld; Herbert John, Munich; Wolfgang Kraus, Hamburg, all of Fed. Rep. of Germany

[73] Assignee: MAN Nutzfahrzeuge GmbH, Munich, Fed. Rep. of Germany

[21] Appl. No.: 54,417

[22] Filed: May 26, 1987

[30] Foreign Application Priority Data

May 28, 1986 [DE] Fed. Rep. of Germany ....... 3617961

[51] Int. Cl.$^4$ .............................................. B62D 33/6
[52] U.S. Cl. .................. 296/190; 180/89.14; 180/89.16; 180/89.18; 280/163
[58] Field of Search ................. 296/190, 188, 194, 70; 180/89.14–89.19, 90; 280/163

[56] References Cited

U.S. PATENT DOCUMENTS

| 2,699,223 | 1/1955 | Brumbaugh | 296/190 |
| 3,055,417 | 9/1982 | May | 296/190 |
| 3,378,278 | 4/1968 | Froitzheim et al. | 296/190 |
| 3,588,168 | 6/1971 | Froitzheim | 296/190 |
| 3,765,715 | 10/1973 | Franchini | 296/188 |
| 4,215,899 | 8/1980 | Schmidt et al. | 296/190 |

FOREIGN PATENT DOCUMENTS 2709518 9/1977 Fed. Rep. of Germany .
2821598 11/1979 Fed. Rep. of Germany .
1575001 9/1980 United Kingdom .

OTHER PUBLICATIONS

Nutzfahrzeug, Langer als das kurze, kurzer als das lange, Jul., 1977, p. 37.

Primary Examiner—Robert R. Song
Attorney, Agent, or Firm—Scully, Scott, Murphy & Presser

[57] ABSTRACT

The invention provides a concept for a series of forwardly tilting truck cabs which may be readily adapted to different sizes of trucks. The basic structure of the cab comprises a front wall, a back wall, a roof assembly and a floor assembly. A plurality of standard functional modules may be fitted to the basic cab. The complete access step unit is separate from the cab and is directly secured to the vehicle chassis. Exposed parts of the cab are provided with stiffening members of which at least some are adapted to perform additional functions.

25 Claims, 19 Drawing Sheets

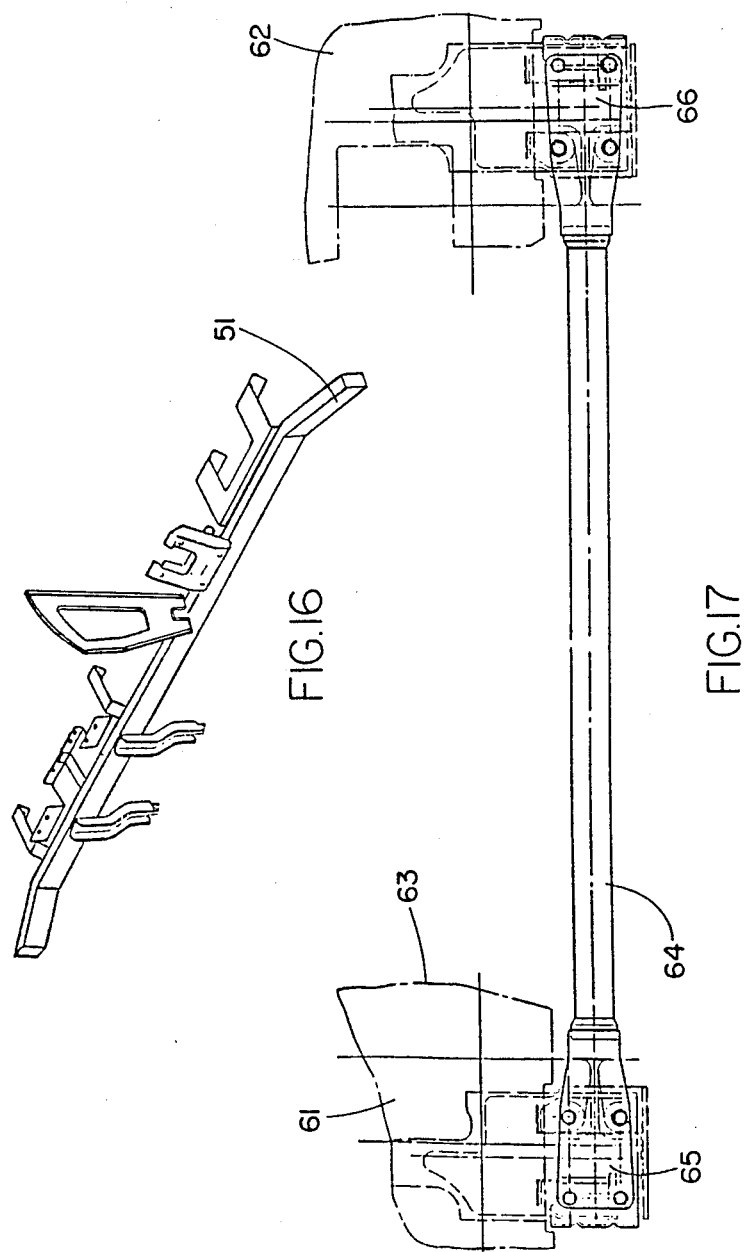

DRIVER'S CABS

BACKGROUND OF THE INVENTION

The invention relates to driver's cabs for front steered trucks of the type which is able to be rocked forwards.

So far driver's cabs of different sizes have been designed with an ad hoc adaptation to the respective requirements. To take an example, different types of doors have called for the use of different production tools. The same applies for the design and production of the basic cab (i.e. the basic load bearing structure of the cab) and for functional items which are arranged inside the cab. Furthermore, in the prior art the driver's access steps have been connected with the cab so that access to the drive units is impeded when it comes to carrying out maintenance or repairs.

SHORT SUMMARY OF THE INVENTION

Accordingly one object of the invention is to evolve a design of driver's cab for trucks with front steering in accordance with which the production of the cab for a whole series of vehicles may be undertaken with less tooling than has hitherto been possible.

A further aim of the invention is to design a cab which is suitable for mass production with a maximum degree of automation.

A still further objective of the invention is to provide a suitably adapted design such that the cab in the completed condition makes possible a high degree of driver comfort and convenience of servicing.

In order to achieve these or other objects appearing herein, a driver's cab for front steering road trucks adapted to tilt forwards, comprises a rear wall, two side walls, a front wall, a roof part assembly and a floor part assembly combined as a basic cab, together with a plurality of standardized functional modules which are able to be incorporated in cabs of different size in the semi-complete condition of the cab, the access steps being attached to the vehicle chassis separately from the cab and shape stiffening elements are provided at exposed positions of the driver's cab of which at least some are designed for performing additional functions.

Further useful features and developments of the cab in accordance with the invention are defined in the claims.

An account will now be given of various possible driver's cabs of the invention with reference to the drawings hereof.

LIST OF THE VIEWS OF THE DRAWINGS

FIG. 2 shows a cab from the side on a larger scale and with the forwardly tilted position marked in broken lines.

FIG. 3 shows a further cab from the side in the forwardly tilted position.

FIGS. 12 to 22 are various views of cabs in accordance with the invention.

DETAILED ACCOUNT OR WORKING EXAMPLES OF THE INVENTION

In reading the following account of the invention one of the main objects of the invention is to be borne in mind, that is to say that the invention seeks to provide a comprehensive design system for a series of driver's cabs which may be adopted by a manufacturer for most if not all of its commercial vehicle models within a production series. The present account is based on the FIGS. 1 through 22 which as indicated are partly diagrammatic and are partly in the form of different views of a driver's cab to show constructional details thereof.

Figure 1:
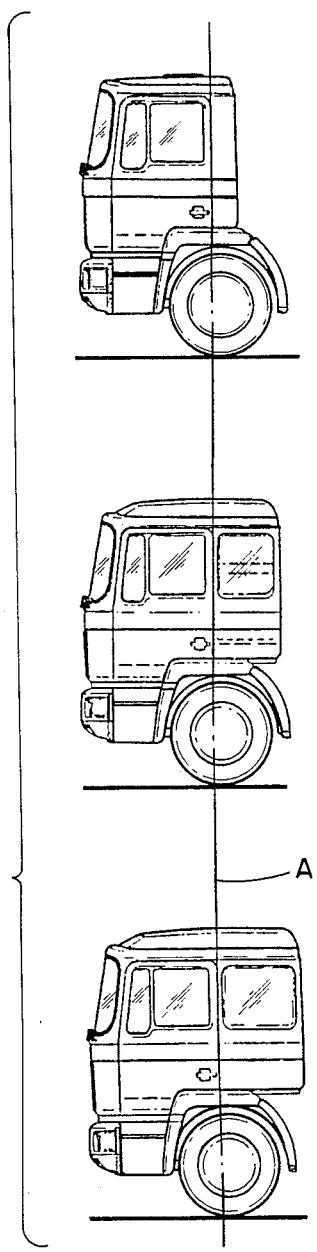
FIGS. 1 to 3 show three different cabs for front steering trucks.
Figure 2:
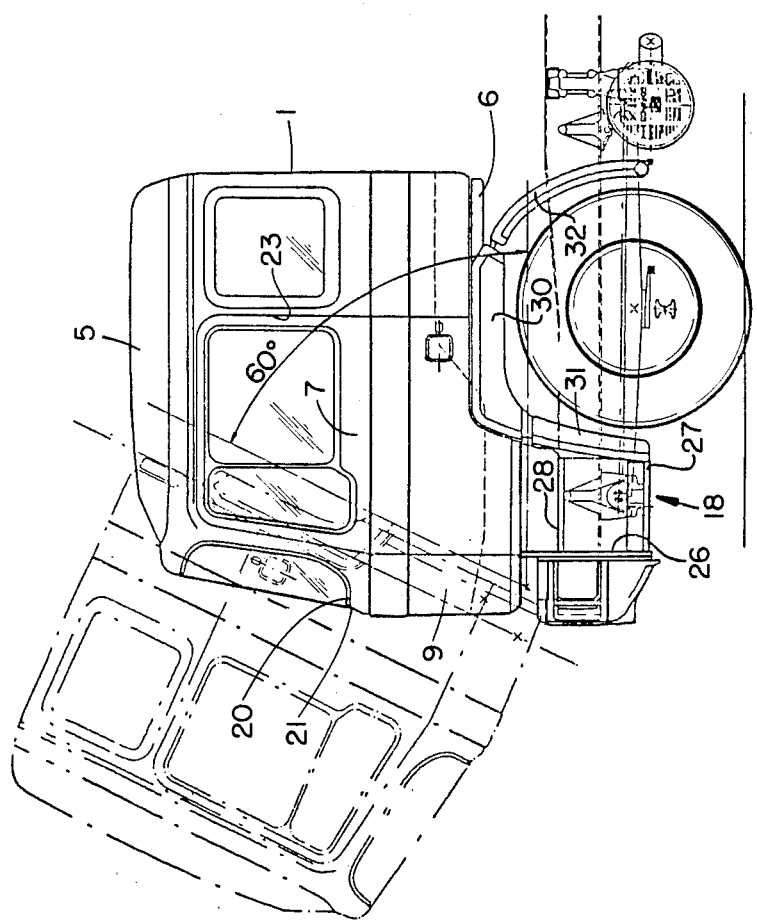

Referring to FIG. 1, the reader will be able to see side views of three different driver's cabs forming part production series for different sizes of front steering road trucks, the cabs being able to be tipped forwards. The line A has been drawn to indicate that the front parts in front of it of the cabs are generally similar, i.e. more or less standardized although the cabs are of different size. The basic cab structure is in each case composed of a back wall 1 (see FIG. 2), two side walls 2 and 3, a front wall 4, a roof assembly 5 and a floor assembly 6. The basic cab structure is complemented by a series of standardized functional modules which may be fitted to basic cabs of different sizes after they have been suitably prepared. No adaptation of the modules themselves is called for. The part-modular design of the cab itself allows components to be swapped in all cases where this is appropriate. The functional modules common to the cab series include the two doors 7 and 8, two corner elements 9 and 10 which are secured to the front wall 4 to protect the flanks of the cab, which may be quickly replaced, and furthermore a front hinge-mounted hatch 11 (in FIG. 4) serving to cover over functional elements secured to the front wall, wheel enclosure parts 12, 13, 14, 15, 30 and 31 (see FIGS. 7 and 10), a modular dashboard 16 (FIG. 21) and if desired a folding bunk 17 which will more especially be incorporated in long-distance trucks.

Figure 3:
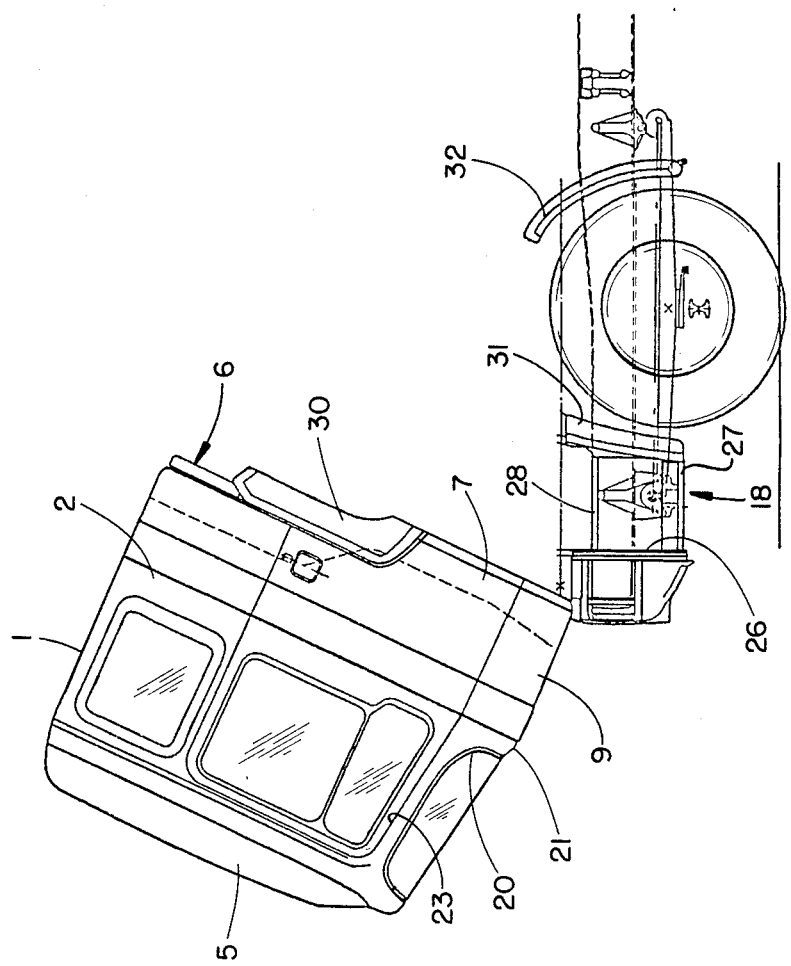

The complete step unit 18 will be seen from FIG. 3 to be secured to the vehicle chassis separately from the driver's cab. As compared with existing designs, this provides for greatly improved access to the drive and other assemblies of the front steered vehicle, which are normally covered,. A further point is that the two step units 18 may be used for storing tools and spares and as a stage on which a mechanic may stand when doing repairs.

Exposed parts of the driver's cab are provided with stiffening members of which at least some are adapted to perform secondary functions. See below on this point.

Figure 12:
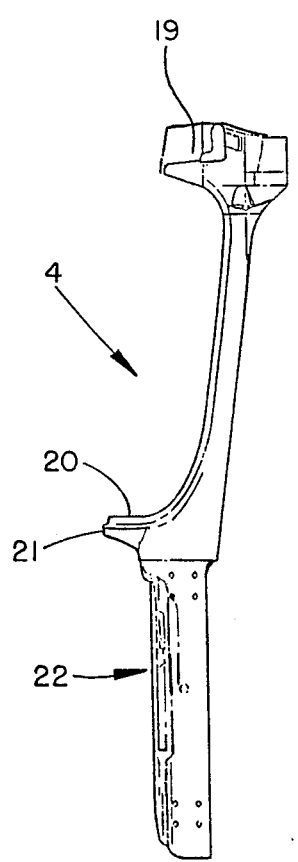
Figure 13:
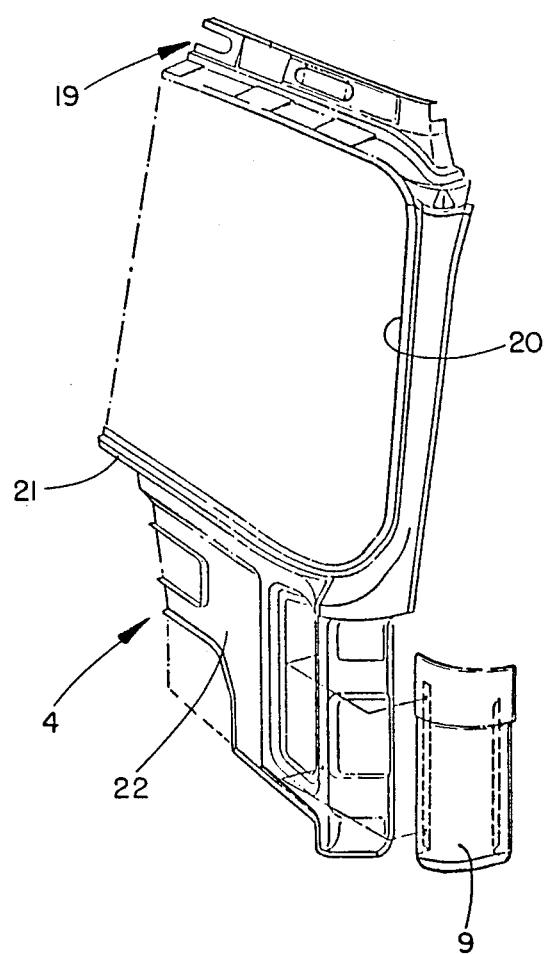

The front wall 4 is in the form of an integral sheet metal pressing (see FIGS. 12 and 13). And in order to provide means for stiffening the roof at the point 19 where it merges with the roof it is bent backwards along its full breadth, where it is also provided with drain means for condensate and liquid used in coating during the course of manufacture. Such measures for draining off liquid also include gutters as well, slots and round holes and other openings or cuts which are necessary for the runoff of condensed water and liquid after coating so that when the cab is removed from the electrolytic coating bath the same is able to escape from the cavities in the cab. Under the crest line 21 next to the opening 20 of the windscreen the front wall 4 is also bent backwards along its full breadth. It is in this drawn back part 22 that the two corners elements 9 and 10, the front hatch 11 with its rocking mechanism or stay and the functional elements covered by the said hatch are secured.

The two side walls 2 and 3 of the basic driver's cab are also manufactured in the form of integral, i.e. one-piece, sheet metal pressings and in all the possible forms of the cab in accordance with the invention they have the same door cutouts or openings 23 and 24 for the installation of the standard-size doors 7 and 8, respectively. This makes it possible for the complex door opening to be produced with one and the same tool setup for all the different possible forms of side wall. The same applies for the doors as well, the latter being able to be produced with the same tool setup and the same components in all.

On the inside along the full width below the crest line 21 the front wall 4 is provided with a stiffening member and there is furthermore a front wall stiffening plate 25 (see FIGS. 5 and 6) as a stiffening structure. It is adapted for the attachment of functional elements which are not shown.

Figure 10:
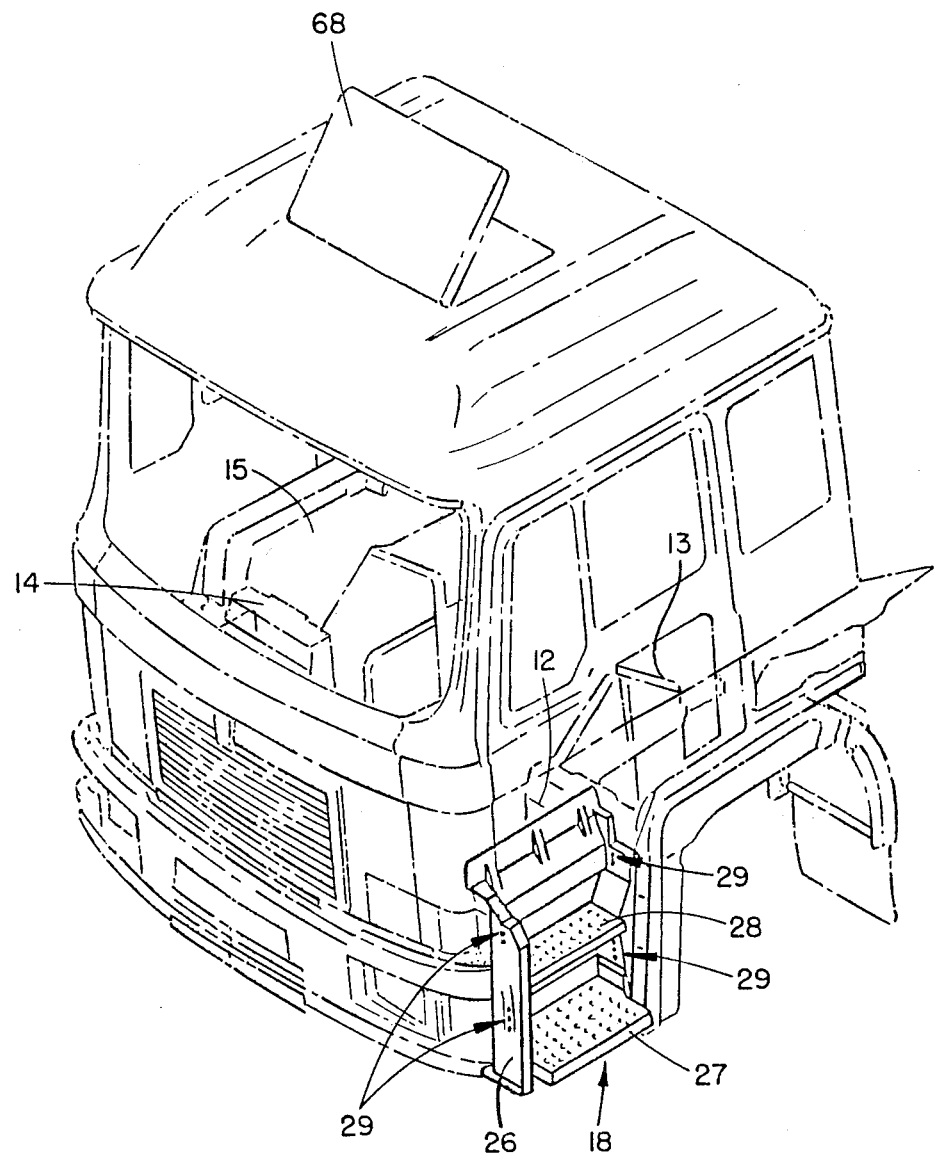
Figure 11:
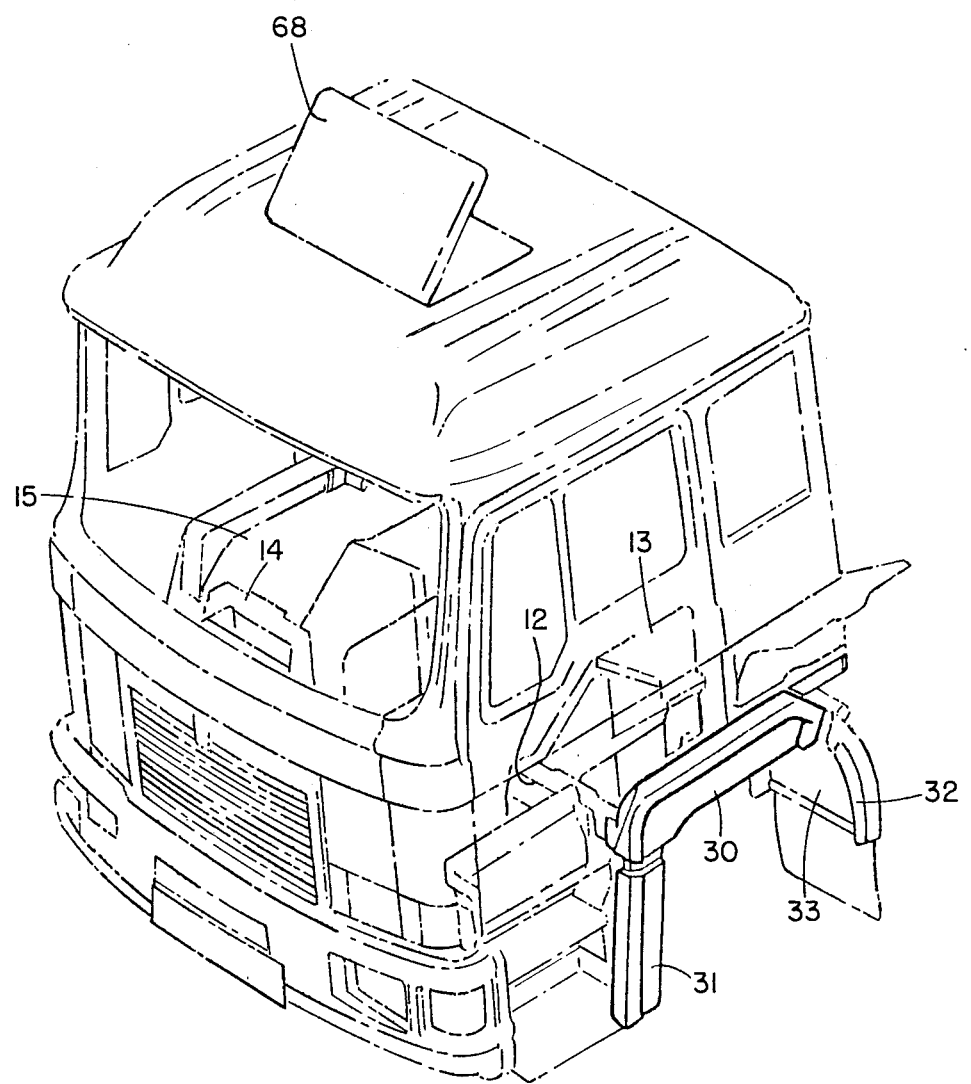

The frame 26 of the step units 18, which are completely separate from the driver's cab, is the same for all different sizes of cab as will more especially be seen from FIG. 1. As shown in detail in FIG. 10 the foot ledges 27 and 28 or rungs of each step unit 18 are able to be mounted at different heights in the frame 26. For this purpose there are mounting means in the steps unit frame 26. These mounting means may, as shown in FIG. 10 for example, take the form of holes 29 arranged at different levels. The arrangement of the foot ledges 27 and 28 so that they may be adjusted in height and varied in their distance apart is in order to meet government regulations despite different sizes of tires and different axles.

The two wheel enclosures are, as already indicated, made up of a number of individual parts in this cab series. Front parts 12 and 14 of each wheel enclosure is either made integrally with the step unit frame 26 as indicated or is made a separate part on the rear side wall of the step unit frame 26. Next to this upper parts 13 and 15 are formed by a section of the floor assembly 6 of the driver's cab. These wheel enclosure parts 12, 13, 14 and 15 are supplemented by external fenders which only serve as screens or covers and are made of a material with a high impact strength. These covers are more especially emphasized in FIG. 11. One of these fender covers 30 supplements the upper wheel enclosure parts 13 and 15, respectively, present on the floor assembly 6 and is arranged next to it at the side. A further cover 31 is arranged laterally on the wheel enclosure parts 12 and 15 for the step unit frame 26. These two covers 30 and 31 are supplemented by a cover 32 that is connected with the rear wheel enclosure part 33 secured to the chassis of the vehicle or are made integrally with it. The covers 30, 31 and 32, if present, are screwed in place on site and may be readily replaced if damaged.

Figure 14:
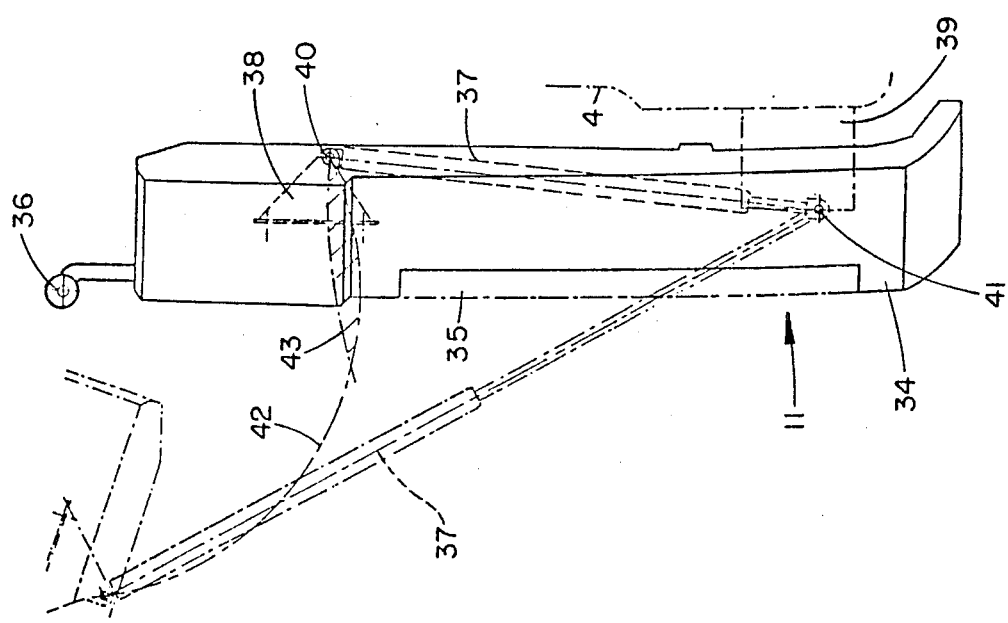
Figure 15:
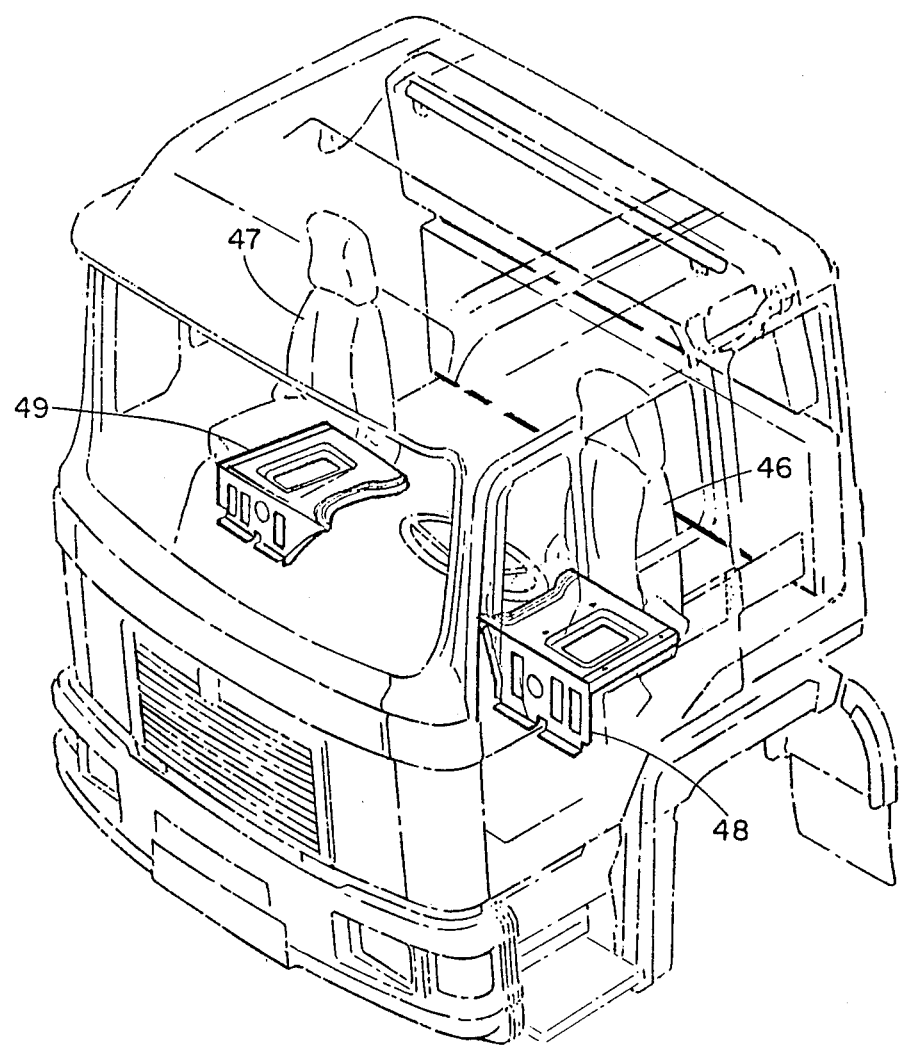
Figure 18:
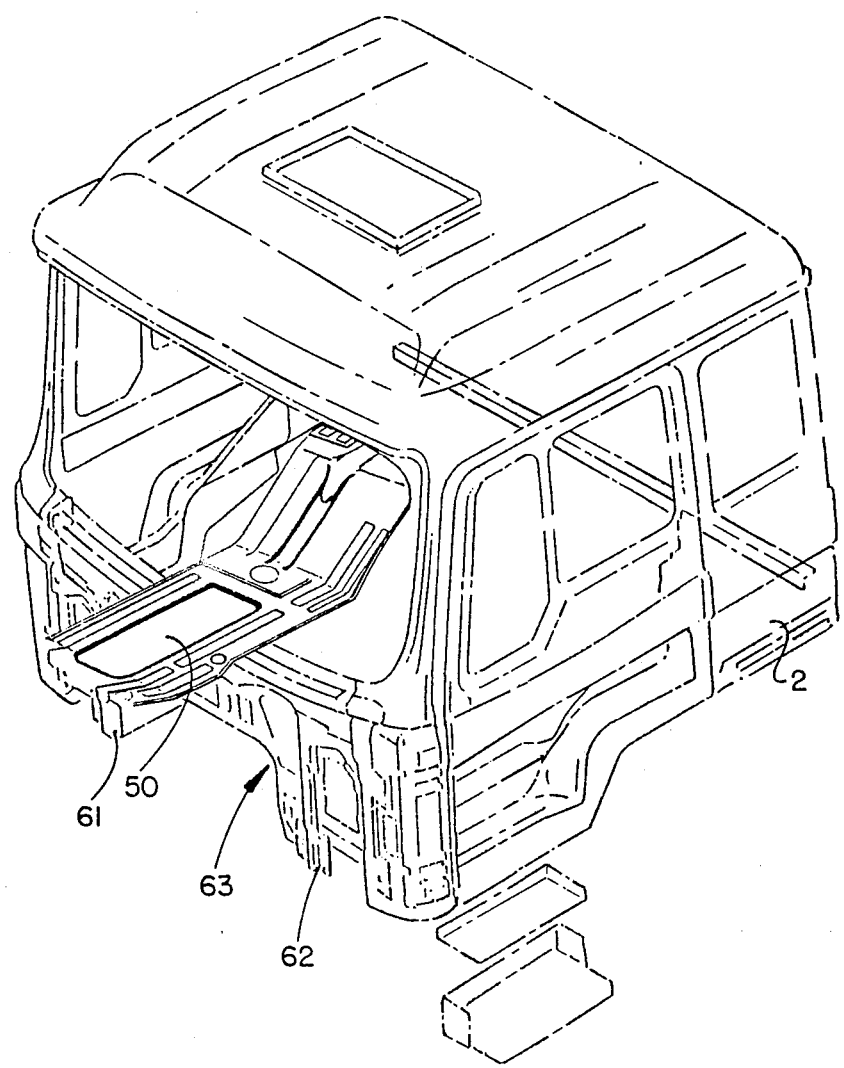

The front hatch 11 mounted on the front wall 4 consists of a frame 34 of glass fiber reinforced plastic and a radiator grill 35, mounted in such frame 34, of thermoplastic material. The front hatch 11 is attached to the front wall 4, as indicated in FIG. 14, by hinge pins 36 so that it may swivel about same in order to open. The front hatch 11 is held both in the open and also in the closed position by two gas springs arranged at its ends in an "past dead center" setting so that it is toggled into its open and closed positions. The closed position is shown in full lines in FIG. 14 and the open position is indicated in chained lines. In the closed setting the front hatch 11 is pressed against flexible buffers on the front wall 4. It is not necessary to provide any catches owing to the toggle action of the two gas springs 37. Each of the gas springs 37 has its top end pivoted to a bearing mount 38 on the front hatch 11 and its lower end is pivoted to a bearing mount 39 secured to the front wall 4. The pivot pins 36 of the front hatch 11, and 40, 41 for the gas pressure spring 37 are so arranged in relation to each other that the desired past dead center or toggle action is produced to keep the hatch in the required position in relation to the front wall. On pivoting the front hatch 11 about the pivot pin 36 out of the shut position the upper pivot point 40 of the two gas pressure springs 37 performs an arc 42, the gas springs 37 being firstly compressed owing to the special arrangement on the lower pivot point 41 during this motion and they then expand again. This is indicated in FIG. 14 by the shaded area between the arcs 42 and 43 about 41. Owing to this mechanism, the front hatch 11 is readily able to be manipulated, for example opened, upwards by the driver by overcoming the dead center position and will then be biased into its open setting. In the like manner, when closing the front hatch 11 it is only necessary to move it past the dead centerposition whereafter the gas pressure springs 37 automatically bias the front hatch 11 into its shut setting. The dead center position corresponds to one in which the pivot pins 36, 40 and 41 are all on a straight line. This opening and closing mechanism for the front hatch is particularly expedient as regards its manipulation and as regards repairs.

Figure 19:
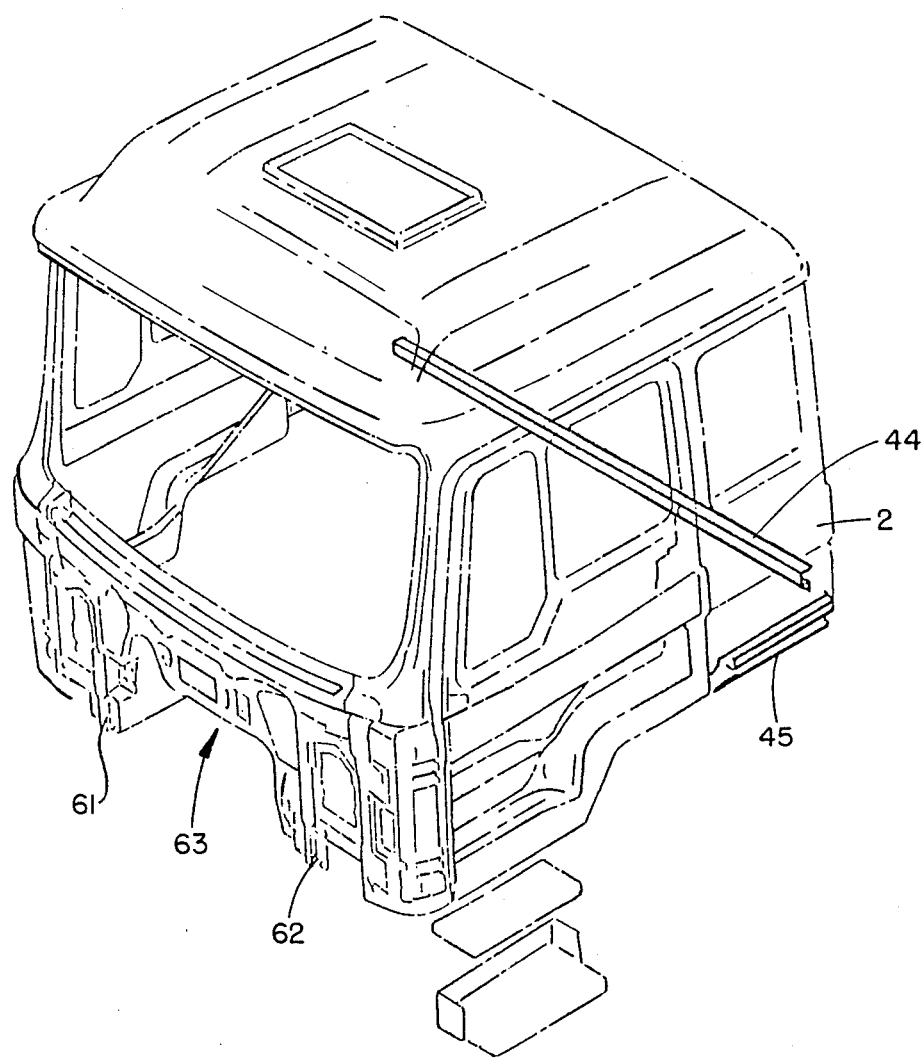

The back wall 1 also formed by a single, integral sheet metal pressing like the two side walls 2 and 3, and the two sides walls themselves, are fixed on lower supporting skeleton parts 44 and 45, see FIG. 19; the same are formed by outwardly open U- and Z-girder or steel section and serve to stabilize the shape of the structure. They do not give rise to any cavity problems in connection with cellulosing and sealing operations. More especially also, they do not cause corrosion problems.

A driver's seat 46 and a codriver's seat 47 are installed in the driver's cab. As is more particularly emphasized in FIG. 15, each seat 46 and 47, respectively, is carried on a seat mount 48 and 49 or pedestal of which each is formed as a load-bearing element of the floor assembly 6 with a stiffening effect. It is welded in place on the floor assembly. Preferably each seat mount 48 and 49, respectively, is formed by a sheet metal pressing.

On the codriver side there are means in and under the floor assembly 6 for the installation of an auxiliary heater (see FIG. 18), involving the provision of an opening 50 in the floor assembly 6. If no auxiliary heater is fitted to the vehicle, the opening will be shut by a cover. If the heater is fitted, the cover will be replaced by a box in which the heater is accepted.

Adjacent to the dashboard 16 the front wall is stiffened by a further member which, as will be seen from FIG. 16, consists of a stiff transverse tube 51 connecting the two side walls 2 and 3 with each other. This tube 51 performs a load bearing function both in the transverse and in the longitudinal directions. It also serves to carry all the parts of the dashboard, of the steering gear and of the air conditioning system. For this purpose there are various brackets and fasteners (not illustrated) on the transverse tube 51. Some details in this respect will be gathered from FIG. 16.

Figure 21:
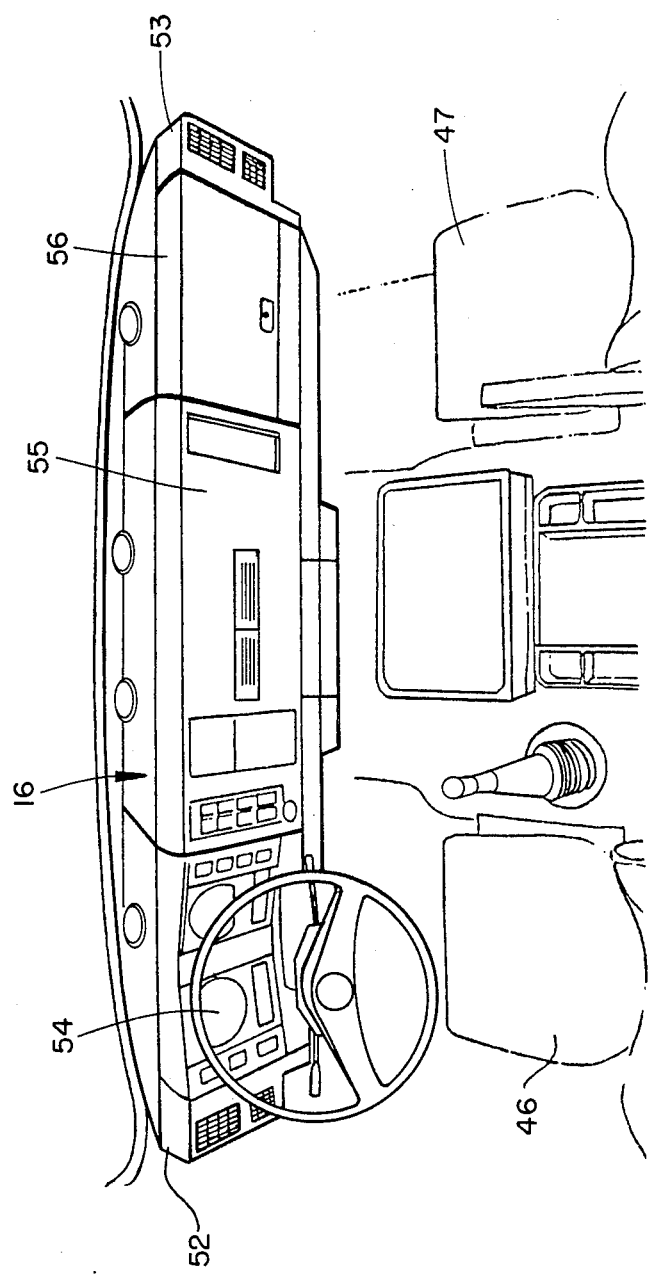
Figure 22:
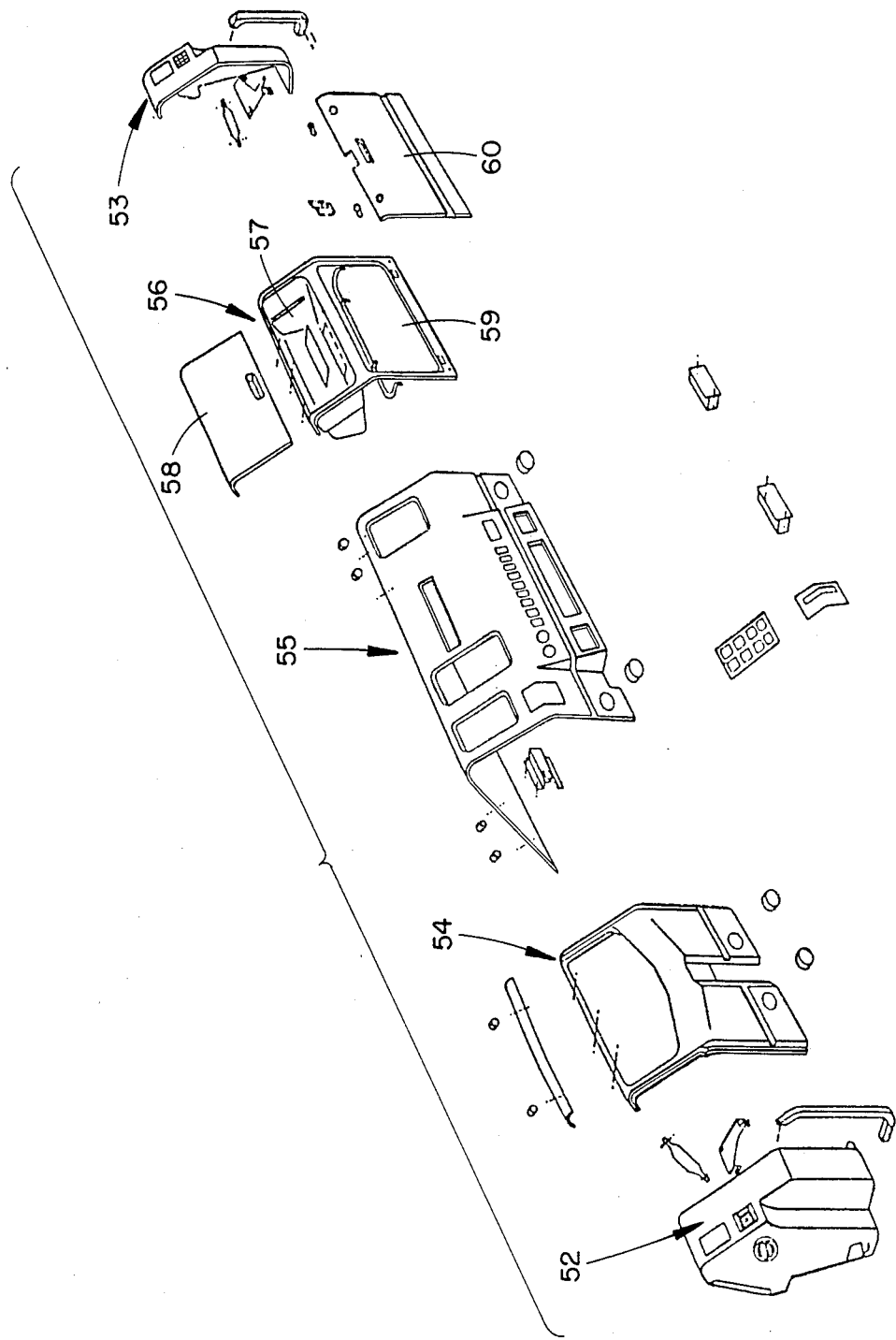

The dashboard 16 secured to the transverse tube 51 is to be seen in an overall view in FIG. 21 and details may be seen in FIG. 22. The dashboard 16 is divided up into separate submodules, that is to say two corner parts 52 and 53, an instrument support 54, a middle part 55 and a glove locker 57 with a central electrical assembly. The glove locker 57 has a cover 58, the cover and the locker being generally referenced 56, and the central electrical assembly 59 has a cover 60. The middle part 55 contains parts of the heating and air conditioning and heating system and controls. It is also fitted with other instrumentalities such as ashtrays and the like. The glove locker 57 with the middle electrical assembly 59 and the instrument support 54 are so constructed that they are identical both for right hand drive and left hand drive versions of the vehicle. They may also be used for different breadths of vehicle, since breadth adaptation is performed by having different sizes of corner parts 52 and 53 have to be selected for different widths of vehicle and in order to complete the dashboard. This submodular design of the dashboard 16 offers the advantage that each separate functional submodule may be readily replaced if necessary and the functional items supported or covered by it may readily be inspected and replaced if called for.

A transverse beam is mounted in a tunnel 63 formed in the floor assembly 6 (for covering the engine and the radiator) at the bottom adjacent to the front wall 4 and to the parts of the floor adjacent thereto. This beam serves as a further stiffening member. At its two ends it bears attachment mounts 65 and 66 (see FIG. 17) by way of which it is screwed to the sections 61 and 62 of the cab.

This means that when repairs are due the radiator and subassemblies joined thereto may be more simply dismounted and replaced inasfar as the transverse beam 64 may be readily removed for this type of repair job.

Figure 4:
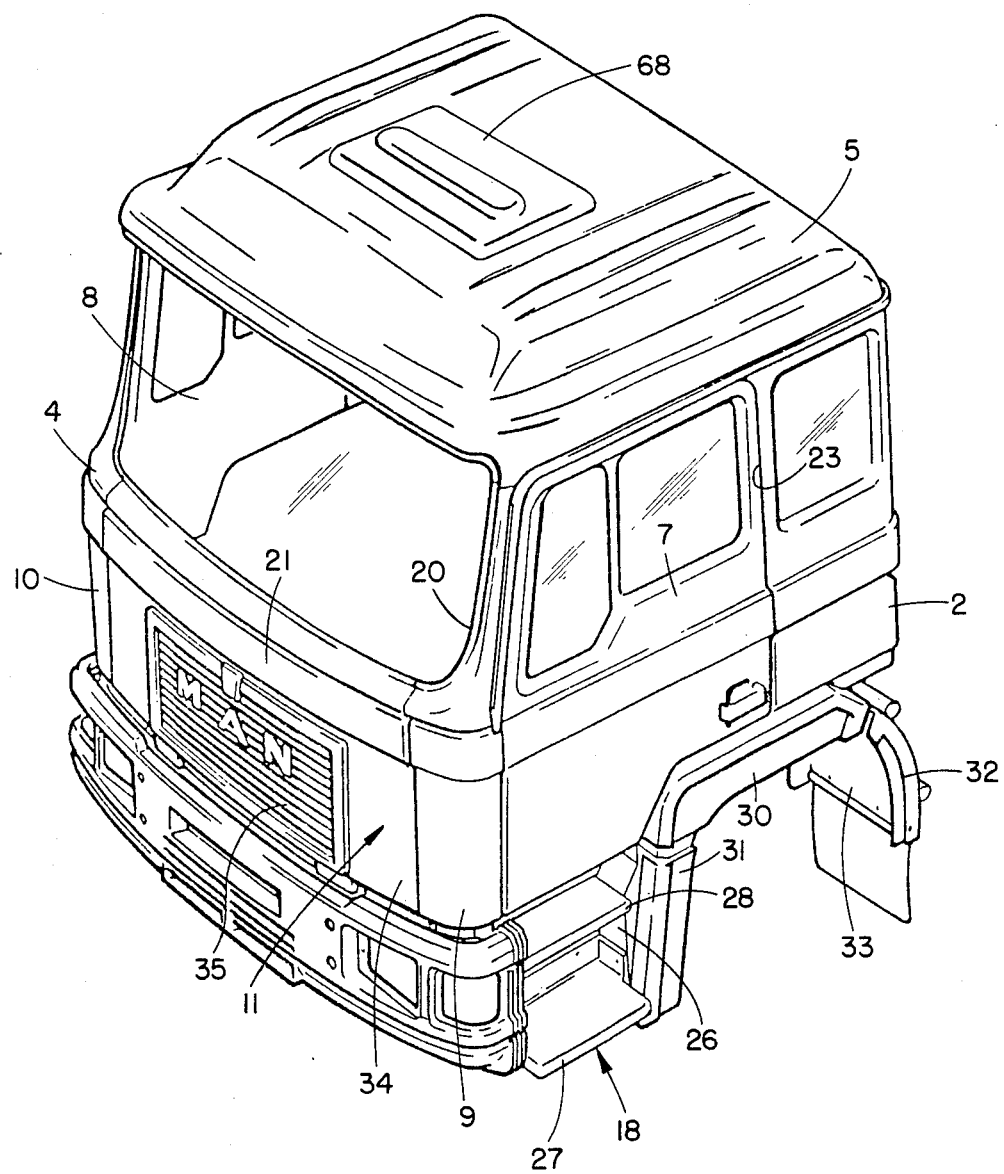
FIG. 4 is a perspective illustrative view of a further cab.
Figure 5:
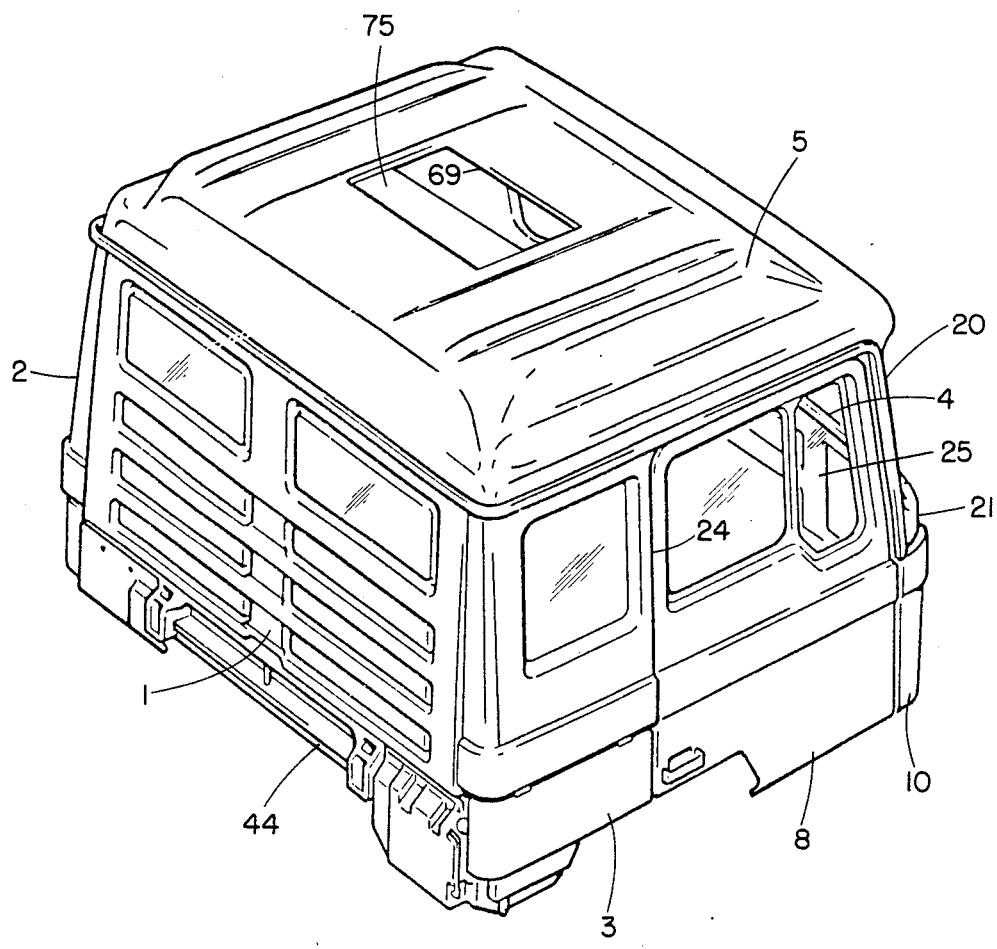
FIG. 5 shows the top part of a cab in an illustrative perspective view.
Figure 6:
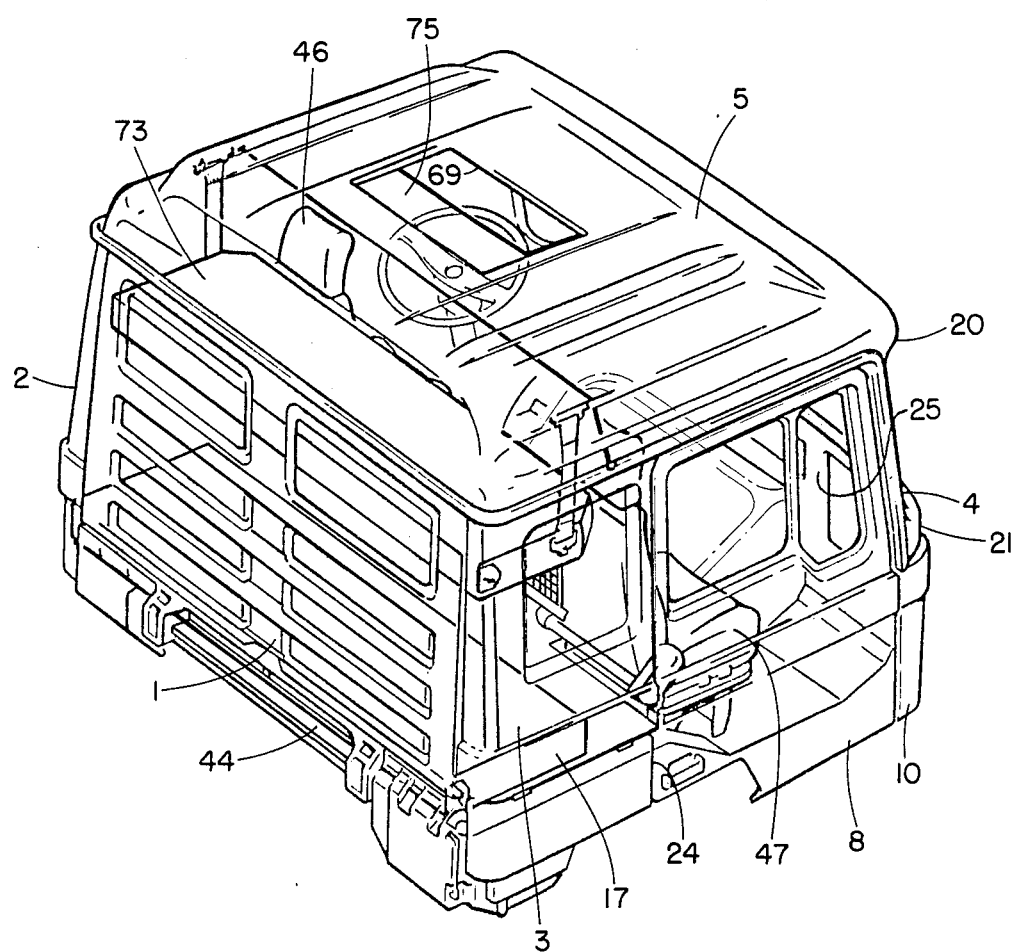
FIG. 6 is a phantom perspective view of the cab of figure 5 with further parts incorporated in it.
Figure 7:
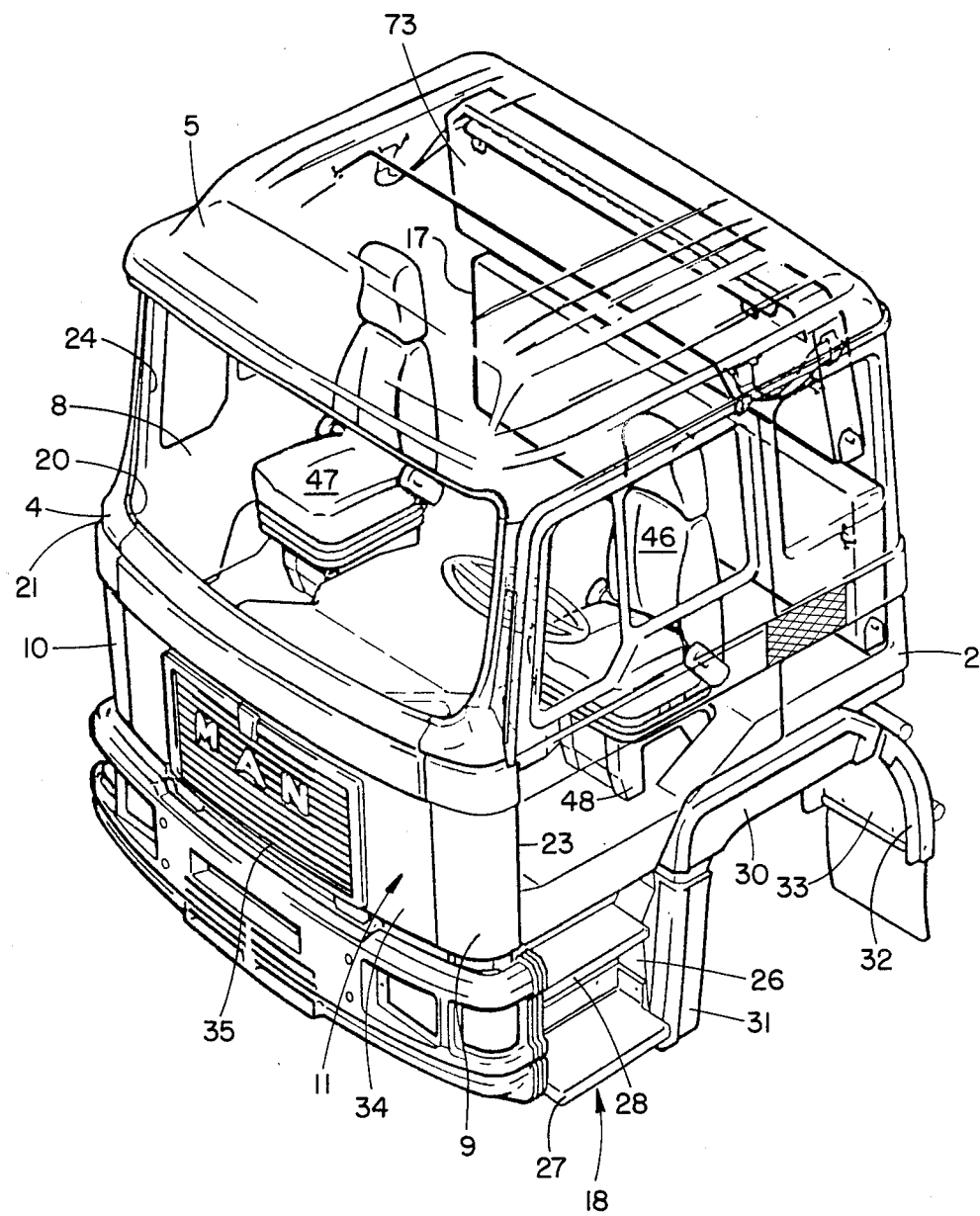
FIG. 7 is a perspective view of a cab to show the positioning of the seats and the bunk therein.
Figure 8:
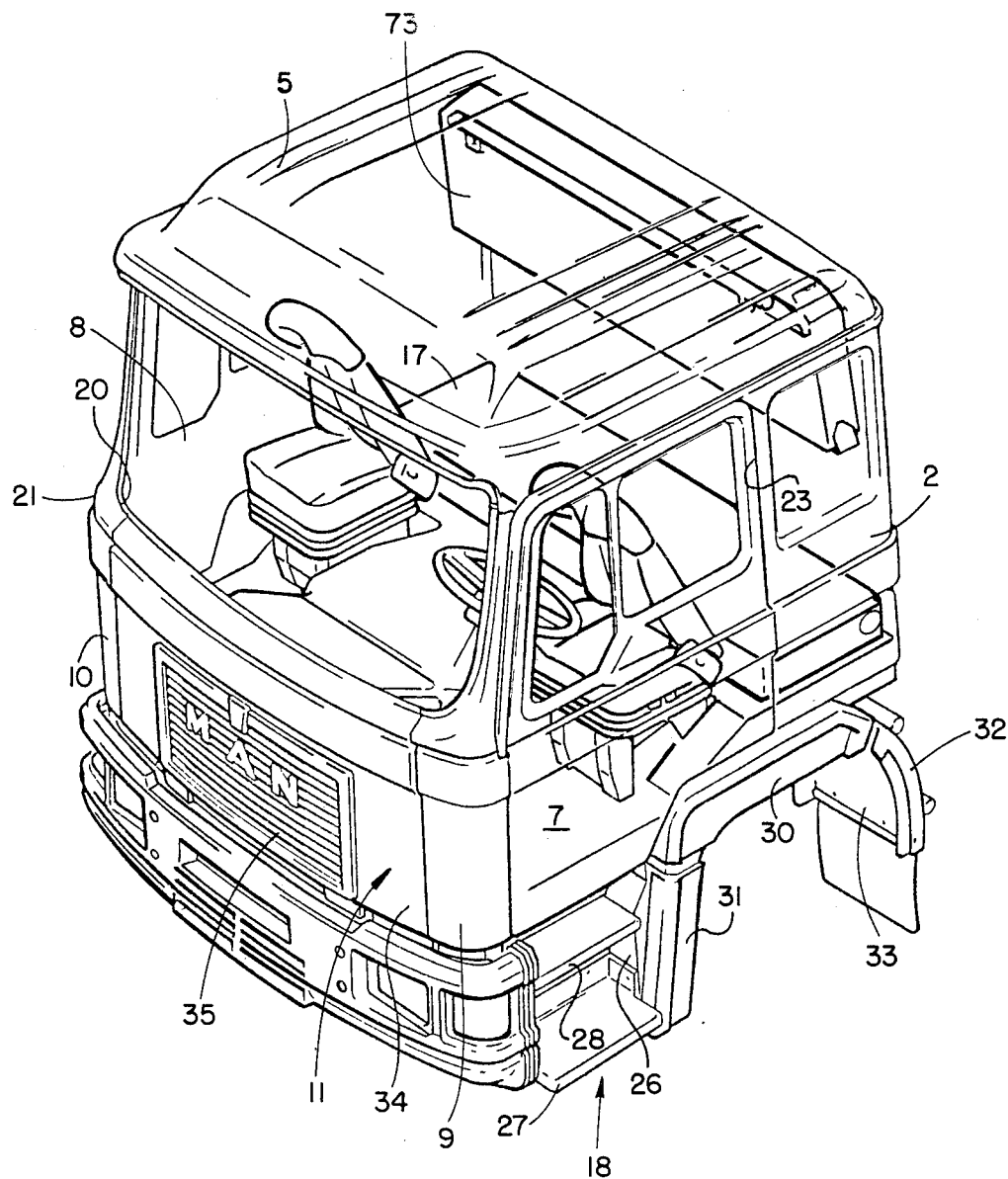
FIGS. 8 to 11 show cabs to emphasise the arrangement of certain components thereon.
Figure 20:
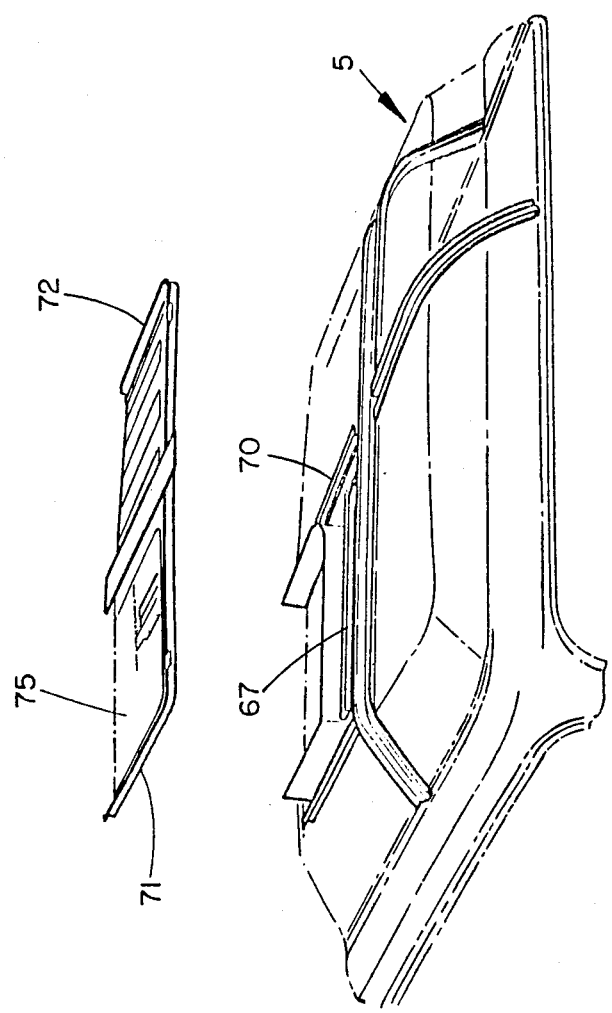

A further stiffening member is in the form of a skeleton 67 in the roof assembly 5 as will be seen from FIG. 20. This skeleton serves for the installation of a sliding roof or for a hinged roof hatch. The design of the driver's cab with a hinged roof hatch 68 is to be seen in a number of the figures. In FIG. 4, for example, the roof hatch 68 is shown in the shut position, while in FIGS. 10 and 11 it will be seen in the opened position. The design with a sliding roof 75 is shown diagrammatically in FIG. 5. The roof hatch 68, or the sliding roof 75 mean that an opening 69 of the roof may be uncovered for purposes of ventilation. This roof opening 69 is to be seen in FIG. 5 for example. In a design with a roof hatch 68 there is hatch mount 70 in this roof opening 69. Alternatively there will be sliding roof support system 71 (top part of FIG. 20) if the cab is fitted with a sliding roof. In either case there will be a suitable operating or control mechanism for the floor hatch or the sliding roof. The part 72 of the sliding roof support system 71 extends as far as the roof opening 69 and serves a guide member for the sliding roof 75 when it is moved into the open position.

Figure 9:
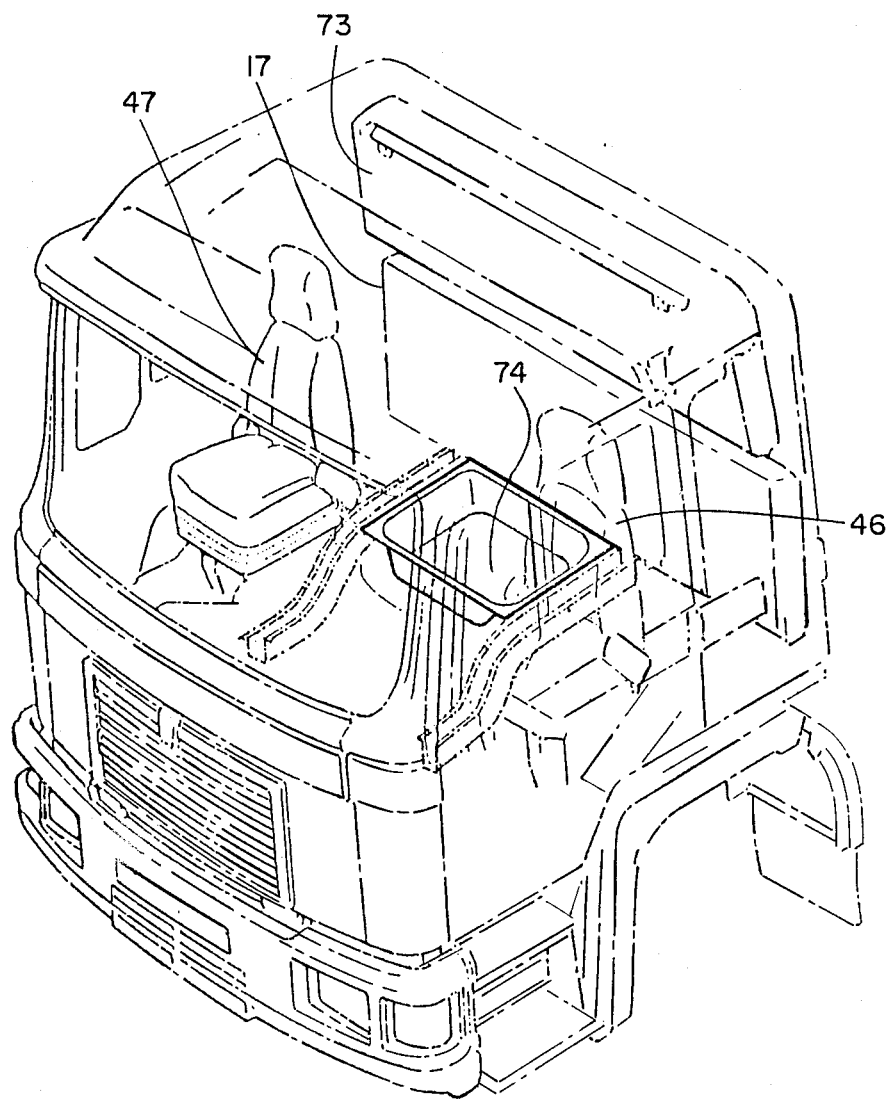

In cabs designed for long-distance trucking there are two bunks placed one over the other behind the two seats 46 and 47, that is to say the lower bunk 17 and the upper bunk 73. The upper bunk 73 may be folded upwards in a conventional manner and locked in such upwardly hinged position. In the present driver's cab design the lower bunk 17 may also be hinged upwards and then locked, see FIGS. 7 and 8. The result is that more space is made available in the interior of the driver's cab than has hitherto been possible so that luggage and parcels may be stowed in the cab. It is especially an advantage in the case of a cab of subfloor long distance truck if the lower bunk 17 may be hinged upwards, since as indicated in FIG. 9 it is possible to have a trough 74 in the floor assembly to accept at least one suitcase or valise. This trough 74 is arranged under the hinged lower bunk 17 and preferably screwed to the floor assembly 6. This means that there is a further substantial increase in the amount of spacer available.

We claim:

1. A forwardly tilting driver's cab for a front steering road truck comprising:
    a basic cab structure made up of
        a back wall
        of two side walls,
        of a front wall,
        of a roof assembly,
        and of a floor assembly and in addition to such basic cab structure
    a plurality of standardized functional modules able to be fitted to different sizes of such basic cab,
    a step unit for driver access to the cab, said step unit being adapted to be attached to the chassis of a vehicle to be fitted with such cab,
    and stiffening members fitted to exposed parts of the cab, at least one of said stiffening members being adapted to perform an auxiliary function.

2. The driver's cab as claimed in claim 1 wherein such functional modules include two doors of said cab, corner parts adapted to be secured to said front wall as side guards, a hinged front hatch attached to the front wall to cover functional elements thereon, wheel enclosure parts and a modular dashboard.

3. The driver's cab as claimed in claim 2 further comprising a hinged lower bunk therein as a further module.

4. The driver's cab as claimed in claim 2 wherein said front wall is in the form of a one-piece sheet metal pressing and is joined to the roof assembly and drawn down with the formation of a roof stiffening structure extending across the full width of the cab, said stiffening structure having drain means for condensed water and coating liquid applied during manufacture, said front wall further having a horizontal crest line under which it is drawn back across its full width in a part in which two such corner parts, the front hatch, an operating mechanism for such hatch and functional elements to be covered by such hatch are mounted.

5. The driver's cab as claimed in claim 2 wherein said side walls are each in the form a one-piece sheet metal pressing.

6. The driver's cab as claimed in claim 3 comprising a front wall stiffening plate fitted internally and extending downwards from the said crest line along its full length, said plate having functional elements fitted thereto.

7. The driver's cab as claimed in claim 1 wherein said step unit comprises foot ledges with height-adjustable mounting means in a frame structure of said unit so that the foot ledges may be set at the legally required levels and spacings to take into account different tire and axle arrangements of the vehicle to which the cab is to be fitted.

8. The driver's cab as claimed in claim 2 wherein said wheel enclosures are respectively in the form of multipart structures with a front part formed integrally with one of said step units, with a rear part adapted to be attached to the chassis of a truck to which the cab is to be secured, and with an upper part formed by a section of the floor assembly of the cab, such wheel enclosure parts being completed by outer covers of which at least a part is adapted to be replaced.

9. The driver's cab as claimed in claim 8 comprising one cover arranged on the wheel enclosure part formed on the floor assembly and a cover formed on the wheel enclosure part arranged on the step unit box, each such cover being arranged to the side.

10. The driver's cab as claimed in claim 2 wherein said hatch secured to the front wall comprises a frame of glass fiber reinforced plastic and a radiator grill set in the frame, said grill being fashioned of thermoplastic resin.

11. The driver's cab as claimed in claim 2 comprising two gas pressure springs pivotally connected with the hatch and the front wall and adapted to be moved through a dead center position when the hatch is moved between open and closed settings thereof so that same is biased by the springs selectively into the closed and open position, it resting on flexible buffers on the front wall when in the closed position.

12. The driver's cab as claimed in claim 1 comprising a load bearing lower back wall skeleton part, on which the side walls are secured, forming the stiffening members and furthermore load bearing lower side wall skeleton parts on which the back wall is secured, said skeleton parts being formed by U-section or Z-section girder open to the outside.

13. The driver's cab as claimed in claim 1 comprising a driver's seat, a codriver's seat and seat mounts thereunder supporting same, such mounts being in the form of stiffening members forming load bearing elements of the floor assembly.

14. The driver's cab as claimed in claim 13 wherein each such mount is formed of pressed sheet metal.

15. The driver's seat as claimed in claim 1 comprising means for the fitting of an auxiliary heater on a codriver side of the cab in the floor assembly.

16. The driver's cab as claimed in claim 15 comprising a cover shutting an opening in the floor assembly, this said opening being designed to receive a box with an auxiliary heater therein.

17. The driver's cab as claimed in claim 2 comprising a transverse tube connecting the two side walls together as a stiffening member arranged adjacent to the front wall at a position for mounting such modular dashboard, said tube being adapted on the one hand to perform a stiffening function and on the other to carry fittings forming part of such dashboard.

18. The driver's cab as claimed in claim 2 wherein said modular dashboard comprises individual sub-modules including two corner parts, an instrument support, a middle part and a glove locker with a central electrical unit, the latter and the instrument support being so constructed that adaptation to different widths of cab and to left hand drive and right hand drive cab arrangements may take place solely by the use of such corner parts with different dimensions.

19. The driver's cab as claimed in claim 1 comprising a tunnel adapted to cover an engine and a radiator of a vehicle to which such cab is to be fitted and at both sides of such tunnel in the lower part of the cab adjacent to the front wall and neighboring parts of the floor assembly there is an adaptation to the fixture of a flexurally stiff transverse member to bridge over the tunnel for stiffening purposes.

20. The driver's cab as claimed in claim 1 wherein said roof assembly comprises a skeleton forming a stiffening member and adapted both for the fitting of a sliding roof with a sliding roof holding means and for the fitting of a hinged roof hatch with a hatch holding means.

21. The driver's cab as claimed in claim 1 adapted for long distance trucking and comprising two bunks arranged therein and seats arranged in front of said bunks, both said bunks being able to be hinged upwards to leave a large stowage space.

22. The driver's cab as claimed in claim 1 adapted to be fitted over an engine of a truck and having a trough in its floor assembly to accept luggage and lower and upper superposed bunks both able to be hinged upwards, the lower bunk covering said trough.

23. A series of at least two driver's cabs, each cab being adapted to be forwardly tilted and comprising:
   a basic cab structure made up of
      a back wall
      of two side walls,
      of a front wall,
      of a roof assembly,
      and of a floor assembly
   and in addition to such basic cab structure
      a plurality of standardized functional modules able to be fitted to different sizes of such basic cab,
      a step unit for driver access to the cab, said step unit being adapted to be attached to the chassis of a vehicle to be fitted with such cab,
      and stiffening members fitted to exposed parts of the cab, at least one of said stiffening members being adapted to perform an auxiliary function.

24. The cabs as claimed in claim 23 having door openings of identical size for the fitting of identical doors.

25. The cabs as claimed in claim 23 each comprising a frame for such step unit, such boxes being of identical size.

* * * * *

UNITED STATES PATENT AND TRADEMARK OFFICE
CERTIFICATE OF CORRECTION

PATENT NO. : 4,813,736

DATED : March 21, 1989

INVENTOR(S) : Klaus Schubert, et al.

It is certified that error appears in the above-identified patent and that said Letters Patent is hereby corrected as shown below:

Column 5, line 21, "different sizes" should read as --different breadths of the corner parts 52 and 53. Or in other words only different sizes--

Column 6, line 31, "spacer" should read as --space--

Signed and Sealed this

Thirtieth Day of January, 1990

*Attest:*

JEFFREY M. SAMUELS

*Attesting Officer*     *Acting Commissioner of Patents and Trademarks*